United States Patent
Dhaygude et al.

(10) Patent No.: US 11,249,964 B2
(45) Date of Patent: Feb. 15, 2022

(54) GENERATING ESTIMATED DATABASE SCHEMA AND ANALYTICS MODEL

(71) Applicant: Microsoft Technology Licensing, LLC, Redmond, WA (US)

(72) Inventors: Amol Dattatray Dhaygude, Redmond, WA (US); Anton Aleksandrovich Klimov, Redmond, WA (US); Amit Prem Manghani, Alameda, CA (US); Sreeram Nivarthi, Redmond, WA (US); Manjit Singh Gill, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 155 days.

(21) Appl. No.: 16/680,364

(22) Filed: Nov. 11, 2019

(65) Prior Publication Data
US 2021/0141774 A1    May 13, 2021

(51) Int. Cl.
*G06F 16/21*    (2019.01)
*G06F 9/54*    (2006.01)

(52) U.S. Cl.
CPC ........... *G06F 16/213* (2019.01); *G06F 9/547* (2013.01); *G06F 16/212* (2019.01)

(58) Field of Classification Search
CPC ....... G06F 16/213; G06F 16/212; G06F 9/547
USPC ........................................................ 707/833
See application file for complete search history.

(56) References Cited

U.S. PATENT DOCUMENTS

| | | | |
|---|---|---|---|
| 7,734,775 B2 | 6/2010 | Barnett et al. | |
| 9,355,160 B2 | 5/2016 | Wolfram et al. | |
| 9,438,648 B2 | 9/2016 | Asenjo et al. | |
| 10,095,732 B2 | 10/2018 | Sowell et al. | |
| 2016/0283527 A1* | 9/2016 | Vandiver | H04L 63/20 |
| 2016/0357747 A1* | 12/2016 | Parthasarathy | G06F 40/205 |
| 2018/0150528 A1 | 5/2018 | Shah et al. | |
| 2018/0373781 A1* | 12/2018 | Palrecha | G06N 3/0427 |

(Continued)

OTHER PUBLICATIONS

"Big Data and Analytics", Retrieved from: https://web.archive.org/web/20180416111530/https:/azure-scenarios-experience.azurewebsites.net/big-data.html, Apr. 16, 2018, 45 Pages.

(Continued)

*Primary Examiner* — Alicia M Antoine
(74) *Attorney, Agent, or Firm* — Alleman Hall Creasman & Tuttle LLP

(57) ABSTRACT

A computing device, including a processor configured to receive a plurality of database entries. The plurality of database entries may include a first portion organized according to a predefined database schema and a second portion not organized according to the predefined database schema. The processor may be further configured to generate an estimated database schema for the second portion and organize the second portion according to the estimated database schema. The processor may be further configured to determine at least one database entry included in the first portion that does not have the estimated data type indicated in the estimated database schema. The processor may be further configured to modify the estimated database schema such that the modified data type matches the estimated data type of the at least one database entry. The processor may be further configured to generate a database analytics model based on the modified database schema.

14 Claims, 9 Drawing Sheets

(56) References Cited

U.S. PATENT DOCUMENTS

2020/0380212 A1* 12/2020 Butler ................... G06F 40/30
2021/0117232 A1* 4/2021 Sriharsha .............. G06F 9/3891
2021/0133189 A1* 5/2021 Prado ................... G06F 16/285

OTHER PUBLICATIONS

"Data lifecycle", Retrieved from: https://web.archive.org/web/20170304210018/https:/cloud.google.com/solutions/data-lifecycle-cloud-platform, Mar. 4, 2017, 32 Pages.

Winters, Jeremy, "Dynamic Data Warehousing of Semi-Structured Data with Snowflake", Retrieved from: https://www.full360.com/2014/12/10/dynamic-data-warehouseing-of-semi-structured-data-with-snowflake.html, Dec. 10, 2014, 12 Pages.

* cited by examiner

GENERATING ESTIMATED DATABASE SCHEMA AND ANALYTICS MODEL

BACKGROUND

Workplace analytics application programs allow data on members and groups within an organization, such as employees and departments at a workplace, to be collected and analyzed. The data used as an input for a workplace analytics application program may include data that is automatically collected from other application programs. In addition, the input data may include data entered by a user of the workplace analytics application program separately from the automatic collection.

SUMMARY

According to one aspect of the present disclosure, a computing device is provided, including a processor configured to receive a plurality of database entries. The plurality of database entries may include a first portion of the plurality of database entries that are structured data organized according to a predefined database schema. The plurality of database entries may further include a second portion of the plurality of database entries that are unstructured data not organized according to the predefined database schema. The processor may be further configured to generate an estimated database schema for the second portion. The estimated database schema may include a respective estimated data type for each database entry included in a sample of the plurality of database entries included in the second portion. The processor may be further configured to organize the second portion according to the estimated database schema. The processor may be further configured to determine at least one database entry included in the first portion that does not have the estimated data type indicated for that database entry in the estimated database schema. The processor may be further configured to modify the estimated database schema such that a modified data type indicated for the at least one database entry in the modified database schema matches the estimated data type of the at least one database entry. The processor may be further configured to generate a database analytics model based on the modified database schema.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Existing workplace analytics application programs are designed to receive structured input data that is organized according to a predetermined schema. This schema may, for example, be a particular file type output by an application program used by employees at a workplace. The workplace analytics application program may generate workplace analytics metrics related to the employees' use of the application program based on the files with the predetermined schema that were output by the application program. Thus, existing workplace analytics application programs allow their users to generate and view metrics related to employees' application program usage that may inform business decision-making. For example the workplace analytics application program may be MICROSOFT MYANALYTICS.

However, in addition to structured data having a predetermined input schema, a workplace may have unstructured data for which a user may wish to generate metrics. Unstructured data may have a schema that is unknown to the user. In some examples, unstructured data may be stored without metadata that indicates how the unstructured data is organized. Existing workplace analytics application programs are not equipped to integrate structured data and unstructured data when generating workplace analytics metrics. In addition, the unknown schemas of unstructured data may vary widely both between and within workplaces. A set of unstructured data may also include portions with structures or data types that do not match the rest of the set. Thus, it may be impractical to check whether the unstructured data has a schema selected from a predefined set of candidate schemas.

As a result of the above difficulties in generating workplace analytics metrics from unstructured data, information that would be valuable for business decision-making may be omitted from workplace analytics metrics. Due to this omission of metrics based on unstructured data, the metrics generated by existing workplace analytics application programs may be incomplete and misleading in ways that negatively affect business decision-making.

Figure 1:
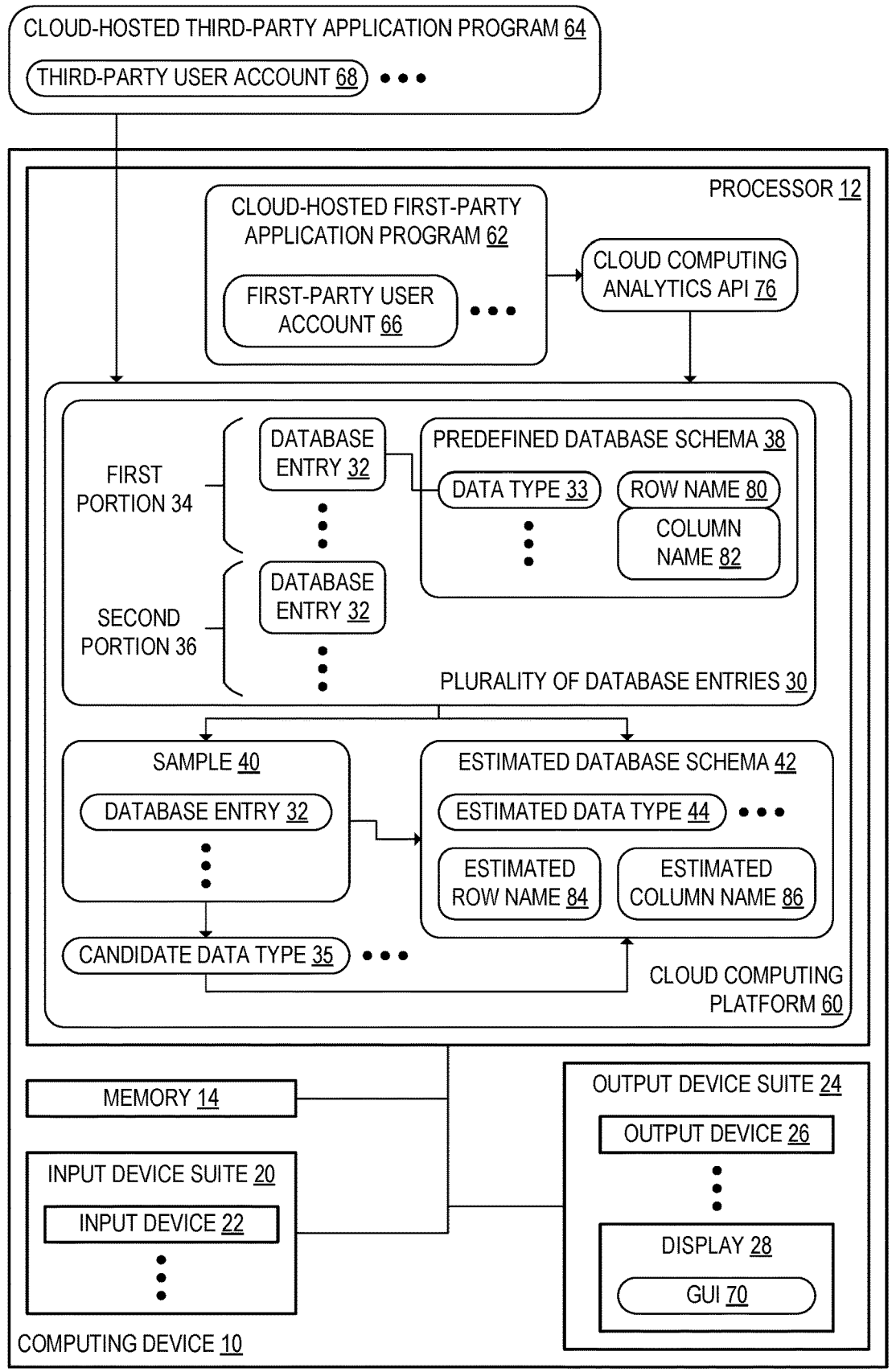
FIG. 1 schematically shows an example computing device according to one embodiment of the present disclosure.

In order to address the above deficiencies, a computing device 10 is provided, as schematically shown in FIG. 1 according to one example embodiment. The computing device 10 may include a processor 12 and memory 14, which may be communicatively coupled. The computing device 10 may further include an input device suite 20 including one or more input devices 22. For example, the input device suite 20 may include one or more of a keyboard, a mouse, a touch sensor, a microphone, an accelerometer, an angular orientation sensor, a global positioning sensor, or one or more other types of input device 22. The computing device 10 may further include an output device suite 24 including one or more output devices 26. The output device suite 24 may include a display 28 configured to display a graphical user interface (GUI) 70. Additionally or alternatively, the output device suite 24 may include one or more other types of output devices, such as a speaker or a haptic feedback device.

In some embodiments, the functions of the computing device 10 may be distributed between a plurality of communicatively coupled physical computing devices. For example, the computing device 10 may be instantiated as one or more server computing devices that communicate with one or more client computing devices over a network. In this example, some of the functions of the processor 12 and memory 14 may be performed at a cloud computing platform 60 executed on the one or more server computing devices, and the input device suite 20 and the output device suite 24 may be included in a client computing device. The client computing device and the server computing device may communicate via a cloud computing analytics application program interface (API) 70, as described in further detail below.

The processor 12 of the computing device 10 may be configured to receive a plurality of database entries 30. The plurality of database entries 30 may be received via the cloud computing analytics API 76 in embodiments in which the processor 12 executes a cloud computing platform 60. The plurality of database entries 30 may include a first portion 34 of the plurality of database entries 30 that are structured data organized according to a predefined database schema 38. The predefined database schema 38 may specify a data type for each database entry 32 included in the first portion 34. Additionally or alternatively, the predefined database schema 38 may specify one or more rows and/or columns into which the one or more database entries 32 of the first portion 34 are organized. In embodiments in which the predefined database schema 38 specifies one or more rows, the predefined database schema 38 may further include one or more respective row names 84 of the rows. Similarly, when the predefined database schema 38 indicates one or more columns, the predefined database schema may further include one or more respective column names 86 of the one or more columns.

In some embodiments, the first portion 34 of the plurality of database entries 30 may be received from a cloud-hosted first-party application program 62 at which the predefined database schema 38 is defined. For example, the cloud-hosted first-party application program 62 may be a productivity application program such as the word processing, spreadsheet, presentation or email programs included in MICROSOFT OFFICE 365 or other productivity software suite. Alternatively, the first-party application program 62 may be another type of software program. In some embodiments, the cloud-hosted first-party application program 62 may be hosted at the computing device 10. The cloud-hosted first-party application program 62 may be an application program for which one or more metrics related to organization member use of the application program are generated, as discussed in further detail below. The cloud-hosted first-party application program 62 may, in such embodiments, be configured to output the first portion 34 of database entries 32 with the predefined database schema 38 to the cloud computing platform 60 via the cloud computing analytics API 76. Alternatively, the first portion 34 of database entries 32 may be received at the cloud computing platform 60 from a client computing device.

The plurality of database entries 30 may further include a second portion 36 of the plurality of database entries 30 that are unstructured data not organized according to the predefined database schema 38 of the first portion 34. The unstructured data included in the second portion 36 may, for example, be stored as a comma-separated value (.csv) file that does not indicate a respective data type 33 for each database entry 32 and does not group the database entries 32 of the second portion 36 into one or more rows or columns. Alternatively, in some embodiments, the database entries 32 included in the second portion 36 may be stored with a database schema that differs from the predefined database schema 38 of the first portion 34. The database schema of the second portion 36 in such embodiments may have a file type different from that of the predefined database schema 38 of the first portion 34.

In some embodiments, the cloud computing platform 60 may be configured to receive the second portion 36 of the plurality of database entries 30 from a cloud-hosted third-party application program 64. The third-party application program may be any of a wide variety of programs such as a customer relationship management program, email marketing program, messaging application, social network program, or other type of program. The cloud-hosted third-party application program 64 may be configured to store the second portion 36 of the plurality of database entries 30 as large object (LOB) data on the cloud computing platform 60. The cloud-hosted third-party application program 64 may be specific to the line of business and organizational structure of the user's business, and thus may generate the database entries 32 of the second portion 36 with an organization-specific database schema not used by the cloud-hosted first-party application program 62.

In embodiments in which the first portion 34 and the second portion 36 are received from a cloud-hosted first-party application program 62 and a cloud-hosted third-party application program 64 respectively, the cloud-hosted first-party application program 62 and the cloud-hosted third-party application program 64 may respectively include a plurality of first-p arty user accounts 66 and a plurality of third-party user accounts 68. The plurality of first-party user accounts 66 and the plurality of third-party user accounts 68 may be fully or partially overlapping sets of users for whom metrics are generated. The cloud-hosted first-party application program 62 and the plurality of first-party user accounts 66 may be hosted and stored separately from the cloud-hosted third-party application program 64 and the plurality of third-party user accounts 68. For example, as shown in FIG. 1, the cloud-hosted first-party application program 62 and the plurality of first-party user accounts 66 may be stored at the computing device 10, while the cloud-hosted third-party application program 64 and the plurality of third-party user accounts 68 may be stored at another server computing device. Thus, the cloud-computing platform 60 may have access to the predefined database schema 38 generated at the cloud-hosted first-party application program 62 but not to any database schema generated at the cloud-hosted third-party application program 64.

After the first portion 34 and the second portion 36 of the plurality of database entries 30 have been received, the processor 12 may be further configured to select a sample 40 of the plurality of database entries 30 included in the second portion 36. When the second portion 36 is small, the sample 40 may include all database entries 32 included in the second portion 36. Alternatively, the sample 40 may be a subset of the second portion 36.

The processor 12 may be further configured to generate an estimated database schema 42 for the second portion 36. Generating the estimated database schema 42 may include determining a respective estimated data type 44 for each database entry 32 included in the sample 40. In embodiments in which the sample 40 is a subset of the second portion 36, the processor 12 may save computing time that would otherwise be spent estimating the respective estimated data type 44 of each database entry 32. In addition to the estimated data type 44, the estimated database schema 42 may sort the second portion 36 of the plurality of database entries 30 into one or more rows and/or one or more columns. The estimated database schema 42 may include one or more estimated row names 84 of the corresponding one or more rows. The estimated database schema 42 may further include one or more estimated column names 86 of the corresponding one or more columns.

Figure 2:
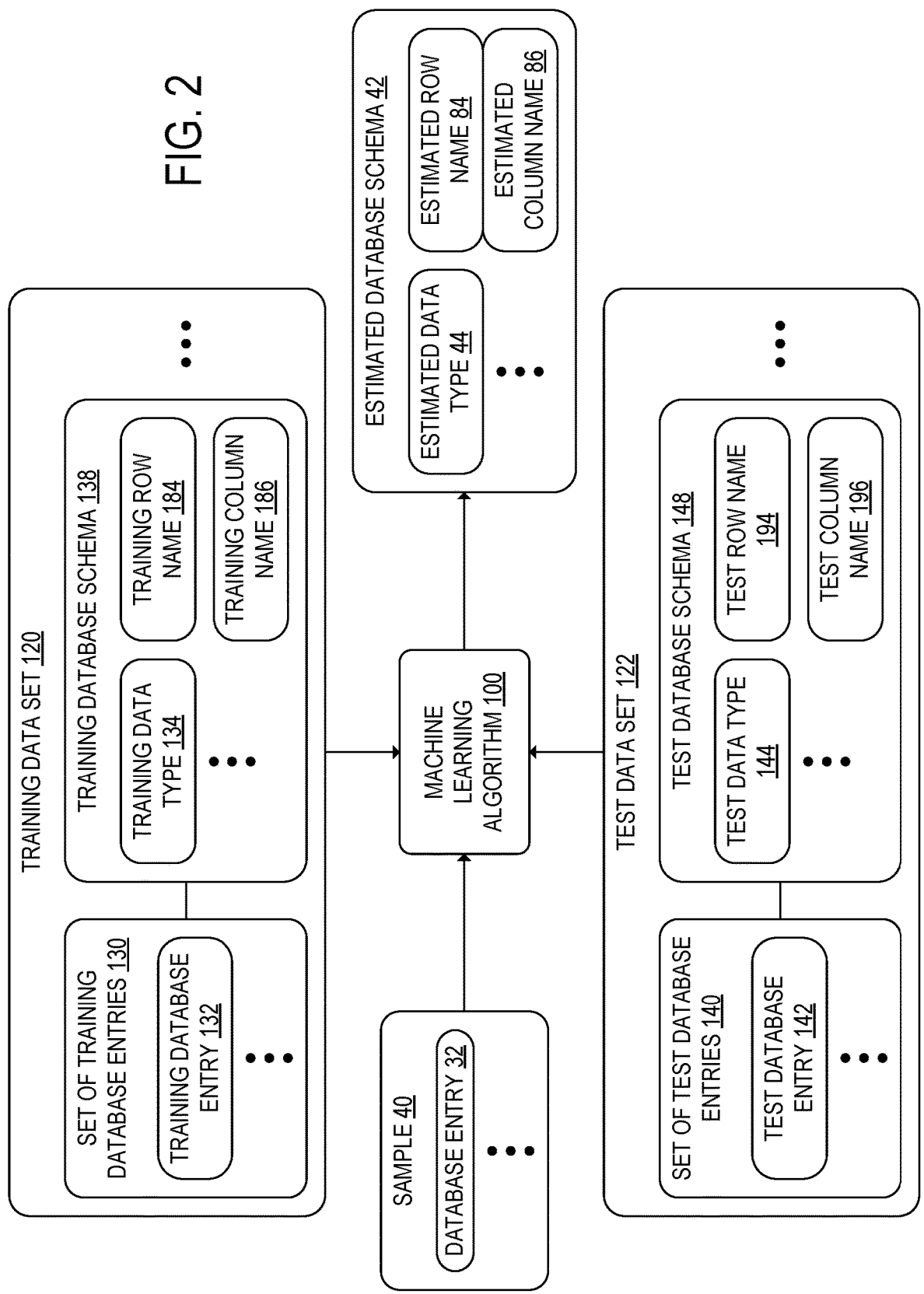
FIG. 2 shows an example machine learning algorithm configured to generate an estimated database schema, according to the embodiment of FIG. 1.

The respective estimated data type 44 of each database entry 32 in the sample 40 may be determined at least in part using a machine learning algorithm 100, as shown in the example of FIG. 2. The machine learning algorithm 100 of FIG. 2 may be trained using a training data set 120 including a plurality of sets of training database entries 130. Each set of training database entries 130 may include a plurality of training database entries 132 and may be paired with a corresponding training database schema 138. The training database schema 138 may include a respective training data type 134 for each training database entry 132. In addition, a training database schema 138 may indicate one or more rows, which may have one or more corresponding training row names 184, and/or one or more columns, which may have one or more corresponding training column names 186.

The machine learning algorithm 100 may, in one example, be a generative adversarial network. Alternatively, other types of machine learning algorithms may be used.

Subsequently to training the machine learning algorithm 100, the processor 12 may be further configured to test the machine learning algorithm 100 with a test data set 122. The test data set 122 may include a plurality of sets of test database entries 140. Each set of test database entries 140 may include a plurality of test database entries 142 and may be paired with a test database schema 148. The test database schema 148 may include a respective test data type 144 for each test database entry 142. The test database schema may further include one or more test row names 194 of one or more rows and/or one or more test column names 196 of one or more columns. One or more neuronal weights of the machine learning algorithm 100 may be adjusted when the machine learning algorithm 100 is tested with the test data set 122.

At runtime, the machine learning algorithm 100 may receive the sample 40 of database entries 32 included in the second portion 36. By applying the machine learning algorithm 100 to the sample 40, the processor 12 may be configured to generate an estimated database schema 42 for the sample 40.

In some embodiments, the processor 12 may be configured to generate the estimated database schema 42 at least in part by, for each database entry 32 included in the sample 40, determining a plurality of candidate data types 35 that syntactically match the database entry 32. A candidate data type 35 syntactically matches a database entry 32 when the database entry 32 would be syntactically valid as a member of the candidate data type 35. For example, "9.00" syntactically matches the types Float and String but not Int. The processor 12 may be further configured to select, as the estimated data type 44 of the database entry 32, a candidate data type 35 that has a lowest memory size among the plurality of candidate data types 35. For example, when the candidate data types 35 for a database entry are Int (4-byte integer), Bigint (8-byte integer), Float, and String, the processor 12 may select the type Int, since it has the lowest memory size of the four candidate data types 35.

After generating the estimated database schema 42, the processor 12 may be further configured to organize the second portion 36 according to the estimated database schema 42. In embodiments in which the sample 40 is smaller than the second portion 36, the processor 12 may be configured to apply the estimated database schema 42 to one or more database entries 32 included in the second portion 36 but not included in the sample 40. Thus, an estimated database schema 42 generated based on a subset of the second portion 36 may be used to organize the entire second portion 36.

The processor 12 may be further configured to identify at least one database entry 32 included in the second portion 36 that does not have the estimated data type 44 indicated for that database entry 32 in the estimated database schema 42. For example, inconsistencies in formatting of the database entries 32 included in the second portion 36 may result in the second portion 36 including one or more database entries 32 with respective data types 33 that do not match other database entries 32 included in the same column of the estimated database schema 42. When such database entries 32 are not included in the sample 40, the estimated database schema 42 may indicate some other estimated data type 44 for the database entries 32 in that column.

Figure 3:
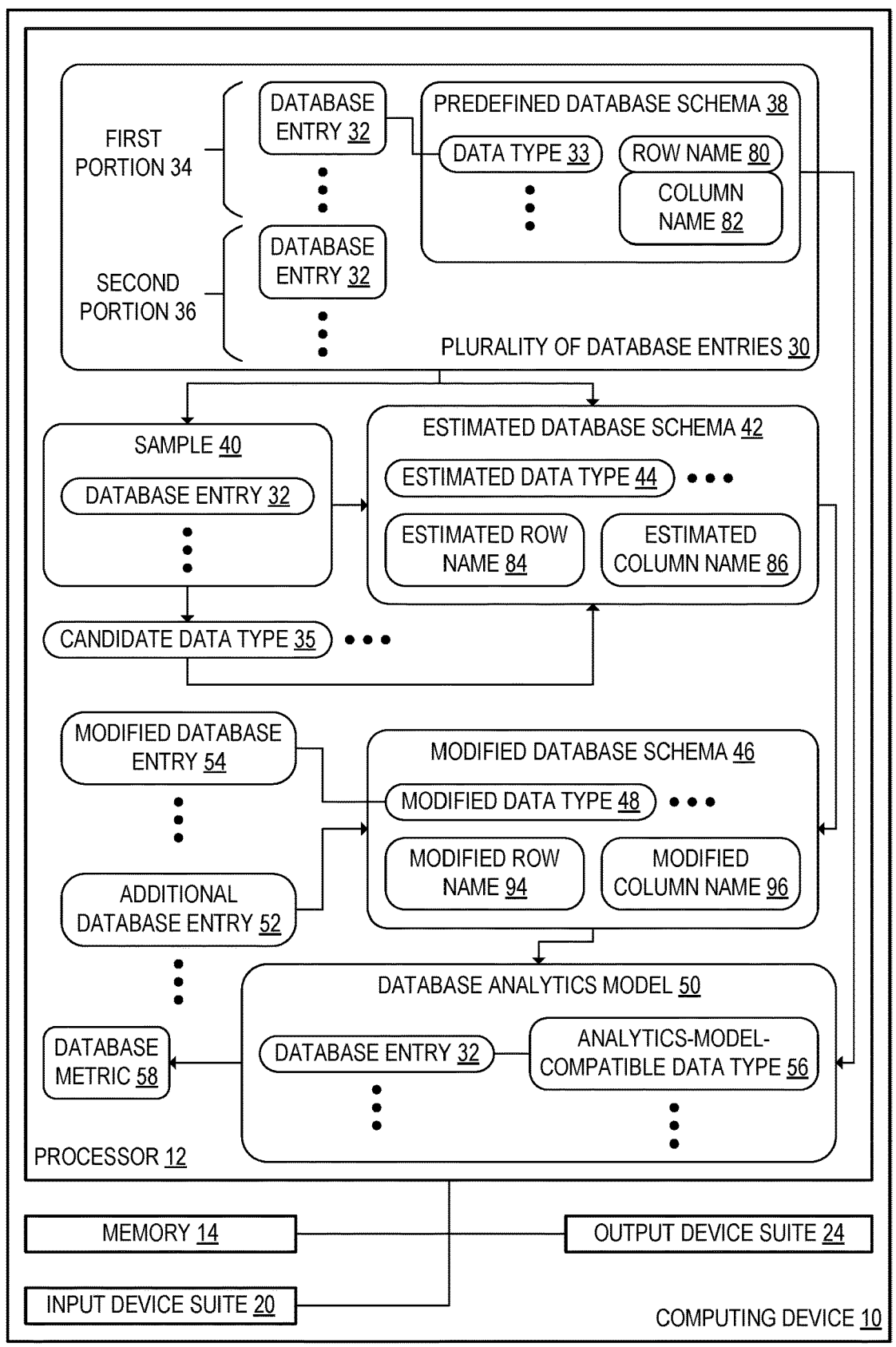
FIG. 3 shows the computing device of FIG. 1 when a modified database schema and a database analytics model are generated.

Turning now to FIG. 3, the processor 12 may be further configured to modify the estimated database schema 42 such that a modified data type 48 indicated for the at least one database entry 32 in the modified database schema 46 matches the estimated data type 44 of the at least one database entry 32. For example, if a database entry 32 with type Float is added to a column indicated as including database entries 32 of type Int in the estimated database schema 42, the estimated data type 44 associated with the column may be changed to Float in the modified database schema 46. In some embodiments, the processor 12 may additionally be configured to modify the estimated row name 84 of at least one row and/or the estimated column name 86 of at least one column such that the modified database schema 46 includes at least one modified row name 94 and/or modified column name 96.

In some embodiments, subsequently to organizing the second portion 36 according to the estimated database schema 42, the processor 12 may be further configured to modify one or more database entries 32 included in the second portion 36 of the plurality of database entries 30 to each have the respective estimated data type 44 indicated for that database entry 32 in the estimated database schema 42. For example, the processor 12 may be configured to modify the one or more database entries 32 when most of the database entries 32 included in a column (for example, a proportion higher than a predetermined threshold) have one estimated data type 44 but a small number of database entries 32 have some other estimated data type 44. In this example, each of the modified database entries 54 may have the estimated data type 44 of the majority of the database entries 32.

Figure 4:
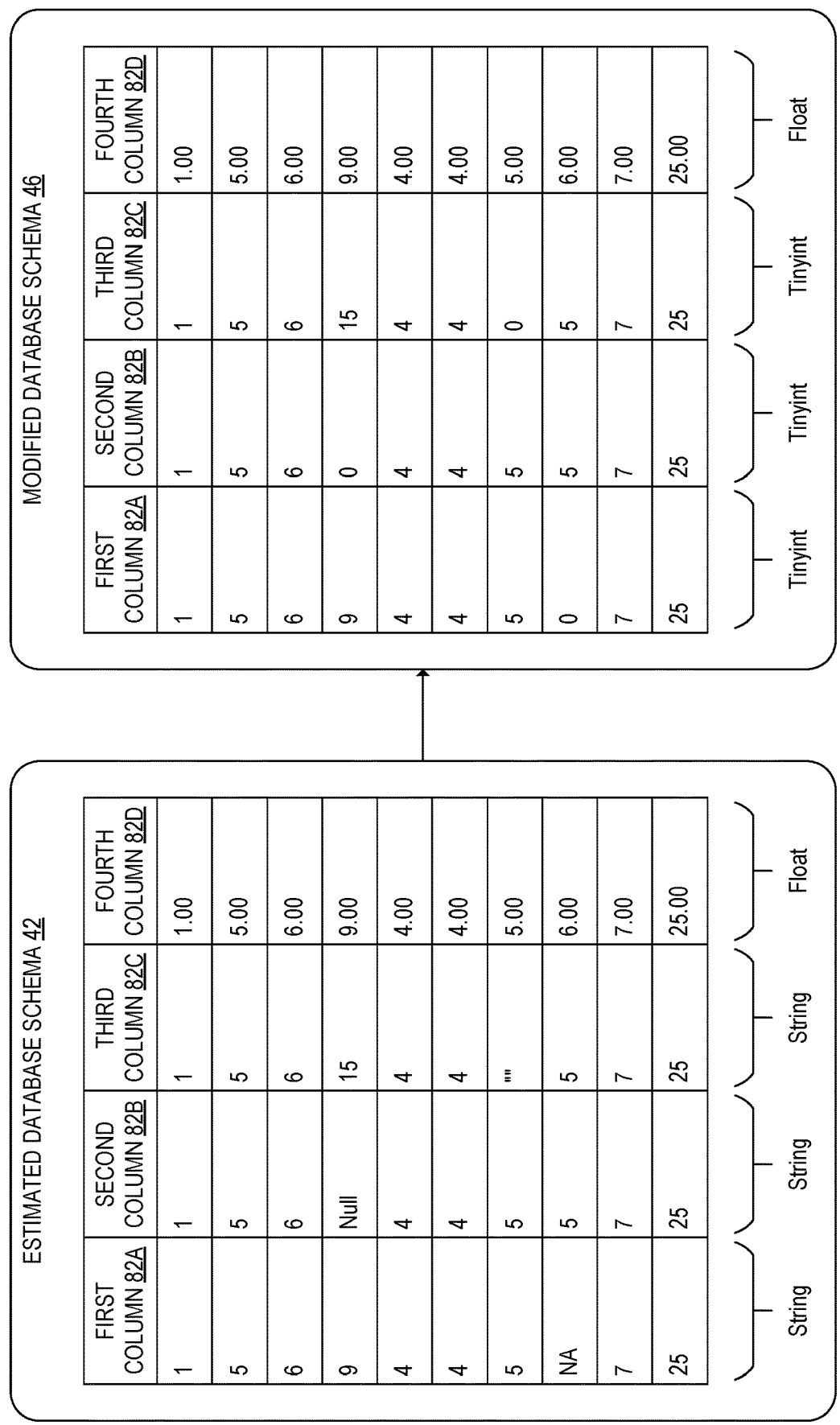
FIG. 4 shows an example modification to an estimated database schema, according to the embodiment of FIG. 1.

FIG. 4 shows an example in which a plurality of database entries 32 are modified in this way. In the example of FIG. 4, the estimated database schema 42 includes a first column 82A, a second column 82B, a third column 82C, and a fourth column 82D. The first column 82A, the second column 82B, and the third column 82C each include a plurality of database entries 32 that could have the type Tinyint (used for integers between 0 and 255). However, the first column 82A, the second column 82B, and the third column 82C each also include another database entry 32 that includes letters or special characters. Thus, the first column 82A, the second column 82B, and the third column 82C are each indicated as having the estimated data type 44 String in the estimated database schema 42. Each database entry 32 in the fourth column 82D is a floating-point number. Thus, the fourth column 82D is indicated as having the estimated data type 44 Float in the estimated database schema 42.

In the example of FIG. 4, the processor 12 may be further configured to determine that each of the database entries 32 in the first column 82A, the second column 82B, and the third column 82C except for one database entry 32 have Tinyint as a candidate data type 35. Thus, those columns could each be encoded in the estimated database schema 42 as including only database entries 32 with the type Tinyint if one database entry 32 in each of the first column 82A, the second column 82B, and the third column 82C were modified. The processor 12 may be further configured to set each of the entry NA in the first column 82A, the entry Null in the second column 82B, and the entry " " in the third column 82C to 0. Thus, the processor 12 may generate a modified database schema 46 in which the first column 82A, the second column 82B, and the third column 82C each include only database entries 32 with the type Tinyint. Since database entries 32 with the type Tinyint occupy less space in memory than entries with the type String, the modified database schema 46 may reduce memory usage at the computing device 10.

Returning to FIG. 3, the processor 12 may be further configured to generate a database analytics model 50 based on the modified database schema 46 and the predefined database schema 38. The database analytics model 50 may be an application program instance via which one or more database metrics may be generated programmatically or in response to user input, as discussed in further detail below.

The processor 12 may be further configured to import the plurality of database entries 30 into the database analytics model 50. In some embodiments, all database entries 32 in both the first portion 34 and the second portion 36 may be imported into the database analytics model 50. Alternatively, one or more database entries 32, such as one or more database entries 32 that were modified as in the example of FIG. 4, may be omitted from the database analytics model 50. The plurality of database entries 30 may be imported into the database analytics model 50 via an application-program interface (API). When the processor 12 imports the plurality of database entries 30 into the database analytics model 50, the processor 12 may perform a join operation over the first portion 34 of the plurality of database entries 30 and the second portion 36 of the plurality of database entries 30.

In some embodiments, the database analytics model 50 may be configured to import the plurality of database entries 32 into the database analytics model 50 at least in part by modifying the respective estimated data types 44 of one or more database entries 32 of the plurality of database entries 30 that are organized according to the modified database schema 46. The estimated data types 44 of the one or more database entries 32 may be modified such that the one or more database entries 32 have respective analytics-model-compatible data types 56. In some embodiments, the modification of the one or more database entries 32 to have analytics-model-compatible data types 56 may be performed when the modified database schema 46 is generated instead of when the plurality of database entries 30 are imported into the database analytics model 50.

The processor 12 may be further configured to generate one or more database metrics 58 from the database analytics model 50 populated with the plurality of database entries 30. The one or more database metrics 58 may respectively indicate one or more properties of the plurality of database entries 30. Thus, the one or more database metrics 58 may make the plurality of database entries 30 more comprehensible to a user by summarizing characteristics of the plurality of database entries 30 that are likely to be relevant to the user's decision-making. For example, the one or more database metrics 58 may include one or more of a collaboration metric, a messaging metric, a time allocation metric, or a survey result. The collaboration metric may indicate, for one or more members of an organization, one or more patterns of collaboration between those members. The messaging metric may indicate a property of messages conveyed to and/or from one or more members of the organization, such as a statistic related to message number, length, timing, or messaging modality. The time allocation metric may indicate an amount of time that a member of the organization spent performing one or more tasks. The survey result may be a statistic related to one or more survey questions answered by a plurality of members of the organization. In addition to the above examples, other types of database metrics 58 may additionally or alternatively be generated.

Figure 5:
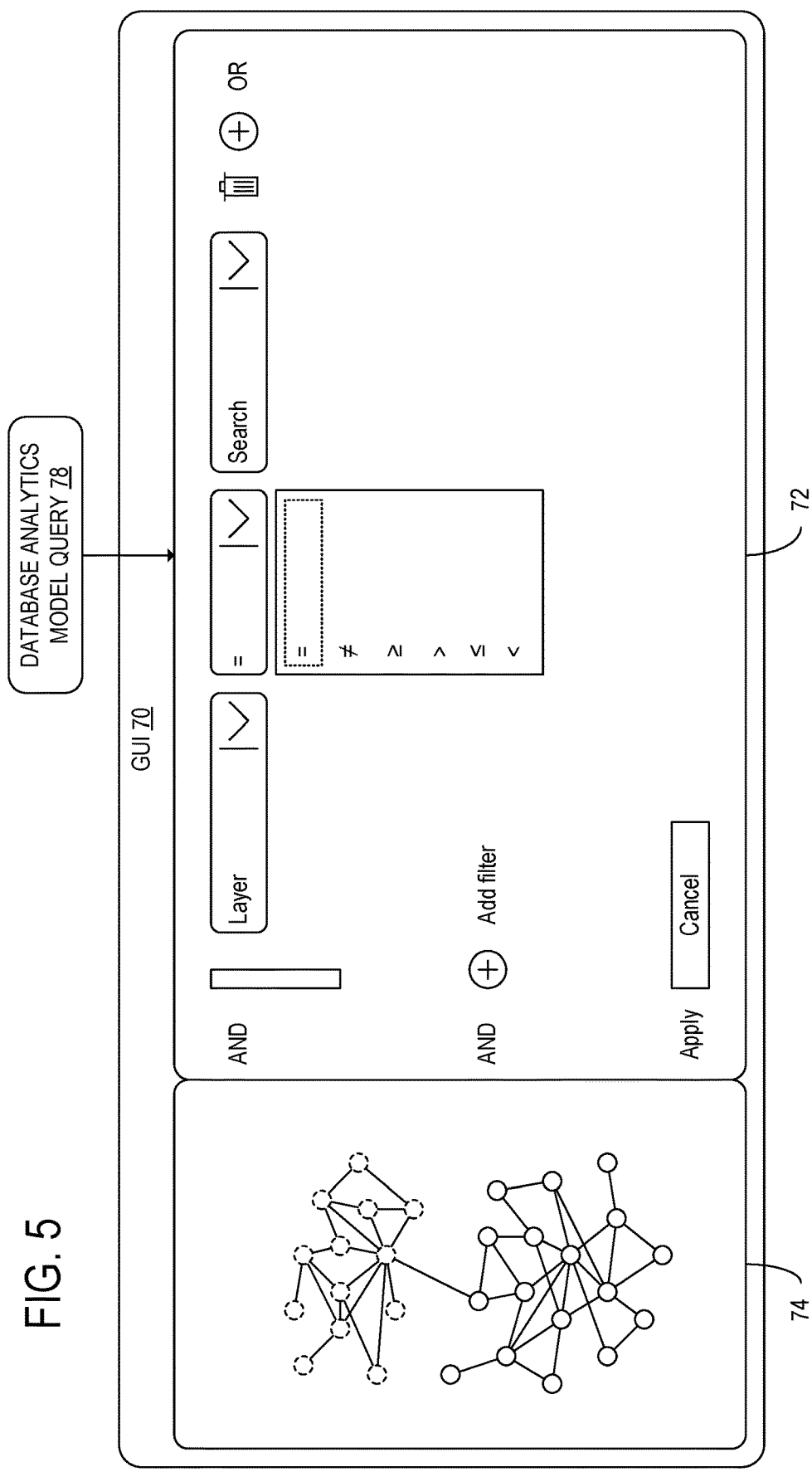
FIG. 5 shows an example graphical user interface that may be displayed on a display of the computing device of FIG. 1.

FIG. 5 shows an example GUI 70 that may be displayed on the display 28 of the computing device 10. In the example of FIG. 5, the processor 12 may be further configured to receive a database analytics model query 78 at the GUI 70. The example GUI 70 shown in FIG. 5 includes a query entry region 72 at which the user may input the database analytics model query 78. The example GUI 70 further includes a database metric display region 74 in which one or more results of the database analytics model query 78 may be displayed. The processor 12 may be further configured to output the one or more database metrics 58 for display at the database metric display region 74 of the GUI 70 in response to the database analytics model query 78.

Returning to FIG. 3, the processor 12 may, in some embodiments, be further configured to receive one or more additional database entries 52 not organized according to the predefined database schema 38 subsequently to generating the modified database schema 46. In such embodiments, the processor 12 may be further configured to organize the one or more additional database entries 52 according to the modified database schema 46. Thus, the processor 12 may receive additional unstructured data and use the modified database schema 46 to organize the additional unstructured data as well as the unstructured data included in the second portion 36 based on which the modified database schema 46 is originally generated.

Figure 6A:
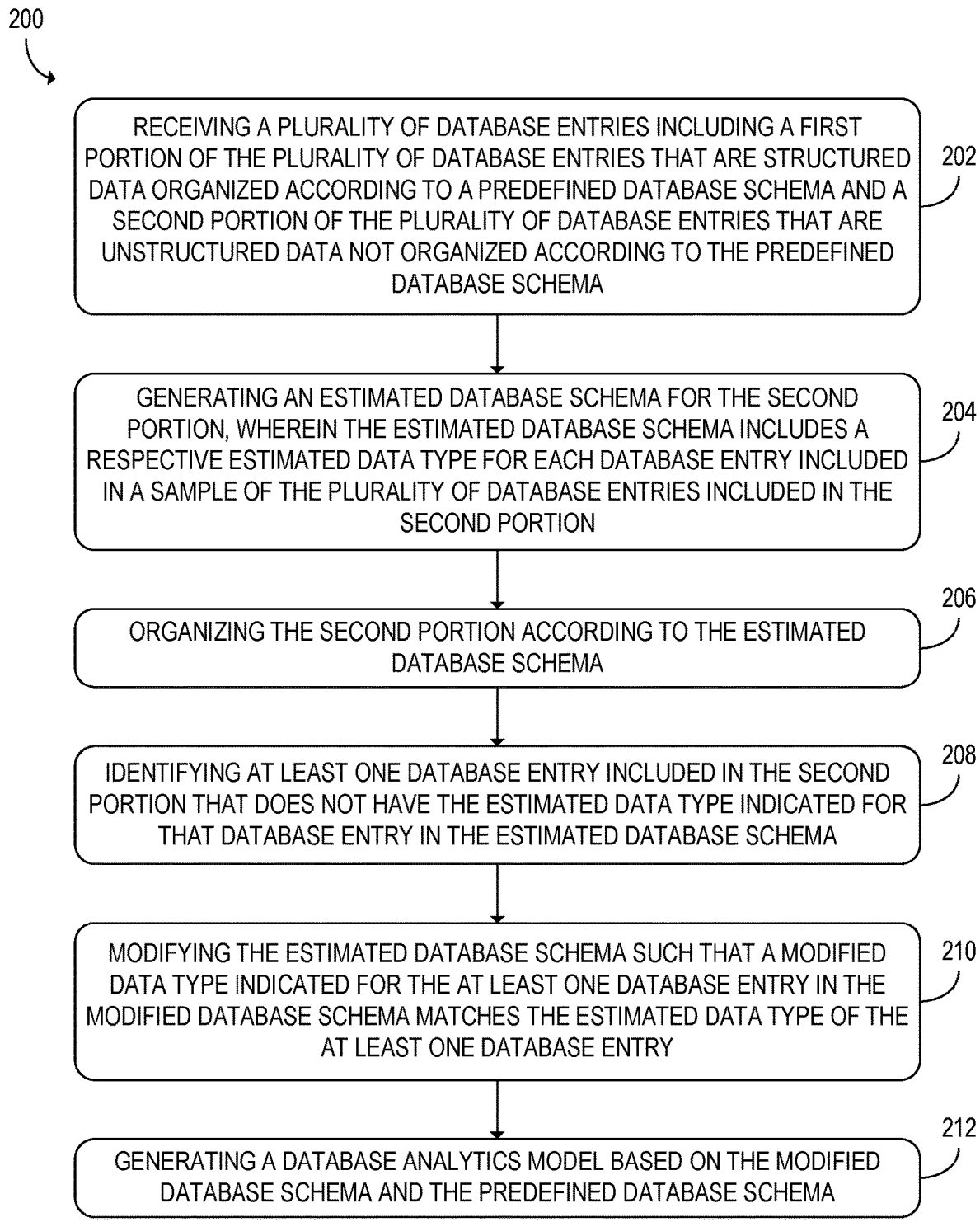
FIG. 6A shows a flowchart of a method that may be performed at a computing device, according to the embodiment of FIG. 1.

FIG. 6A shows a flowchart of a method 200 for use with a computing device. The method 200 may be used with the computing device 10 of FIG. 1 or with some other computing device. At step 202, the method 200 may include receiving a plurality of database entries. The plurality of database entries may include a first portion of the plurality of database entries that are structured data organized according to a predefined database schema. In some embodiments, the first portion of the plurality of database entries may be received from a cloud-hosted first-party application program via a cloud computing API. In addition, the plurality of database entries may include a second portion of the plurality of database entries that are unstructured data not organized according to the predefined database schema. The second portion of the plurality of database entries may be received from a cloud-hosted third-party application program. The first portion and the second portion may each be received at a cloud computing platform. In embodiments in which the plurality of database entries are received from a cloud-hosted first-party application program and a cloud-hosted third-party application program, the cloud-hosted first-party application program and the cloud-hosted third-party application program may respectively include a plurality of first-party user accounts and a plurality of third-party user accounts.

At step 204, the method 200 may further include generating an estimated database schema for the second portion. The estimated database schema may include a respective estimated data type for each database entry included in a sample of the plurality of database entries included in the second portion. The sample may be the entire second portion or a subset of the second portion. The estimated database schema may include one or more columns and one or more rows. Each row may have an estimated row name and each column may have an estimated column name. At step 206, the method 200 may further include organizing the second portion according to the estimated database schema.

The method 200 may further include, at step 208, identifying at least one database entry included in the second portion that does not have the estimated data type indicated for that database entry in the estimated database schema. For example, when the sample is a subset of the second portion that does not include all database entries of the second portion, one or more database entries not included in the sample may not match the estimated data type that is estimated based on the sample. In response to identifying the at least one database entry, the method 200 may further include, at step 210, modifying the estimated database schema such that a modified data type indicated for the at least one database entry in the modified database schema matches the estimated data type of the at least one database entry. Thus, the method 200 may include correcting data type discrepancies between the estimated database schema and the second portion as a whole.

At step 212, the method 200 may further include generating a database analytics model based on the modified database schema and the predefined database schema. The database analytics model may be an application program instance at which a user may generate one or more database metrics.

Figure 6B:
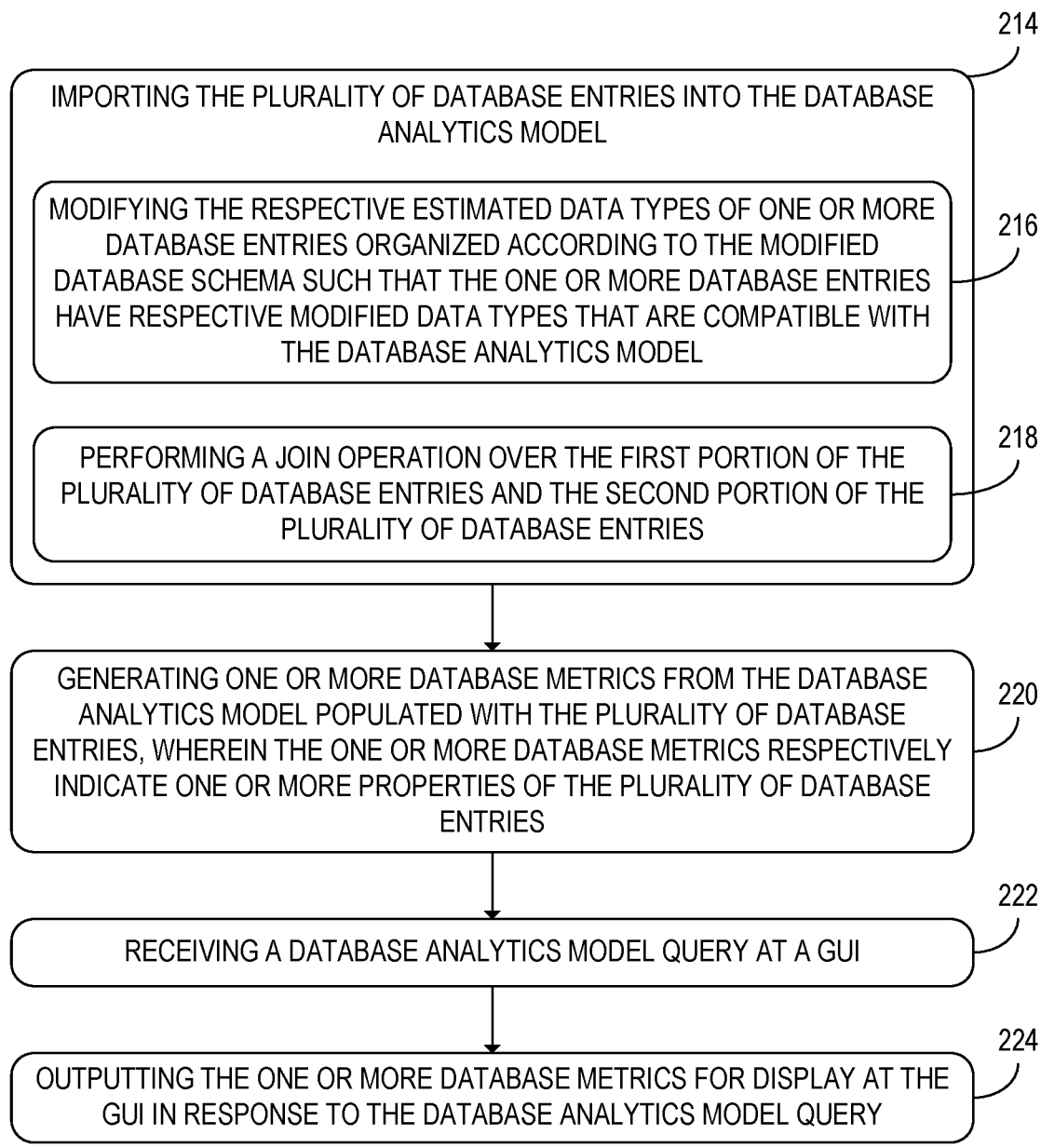
FIGS. 6B-6D show additional steps of the method of FIG. 6A that may be performed in some embodiments.

FIG. 6B shows additional steps of the method 200 that may be performed in some embodiments. At step 214, the method 200 may further include importing the plurality of database entries into the database analytics model. Step 214 may include, at step 216, modifying the respective estimated data types of one or more database entries organized according to the modified database schema such that the one or more database entries have respective modified data types that are compatible with the database analytics model. Additionally or alternatively to modifying the estimated data types of the one or more database entries, step 214 may further include, at step 218, performing a join operation over the first portion of the plurality of database entries and the second portion of the plurality of database entries. Thus, when the plurality of database entries are imported into the database analytics model, the method may include matching the data types of the database entries in the second portion to the data types of the database entries of the first portion.

At step 220, the method 200 may further include generating one or more database metrics from the database analytics model populated with the plurality of database entries. The one or more database metrics may respectively indicate one or more properties of the plurality of database entries. For example, the one or more database metrics may include one or more of a collaboration metric, a messaging metric, a time allocation metric, or a survey result.

When the method 200 is performed at a computing device that includes or is communicatively coupled to a display, the method 200 may further include, at step 222, receiving a database analytics model query at a GUI displayed on the display. In response to receiving the database analytics model query, the method 200 may further include, at step 224, outputting the one or more database metrics for display at the GUI in response to the database analytics model query.

Figure 6C:
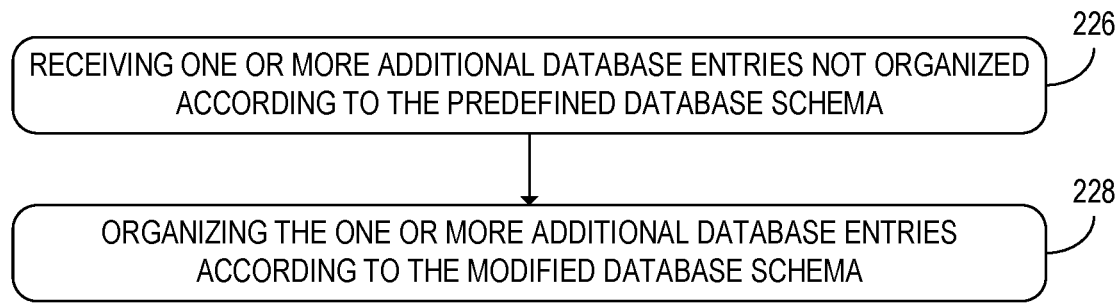

FIG. 6C shows additional steps of the method 200 that may be performed subsequently to modifying the estimated database schema. At step 226, the method 200 may further include receiving one or more additional database entries not organized according to the predefined database schema. The one or more additional database entries may be unstructured data or may alternatively be organized according to a database schema other than the predetermined database schema of the first portion. At step 228, the method 200 may further include organizing the one or more additional database entries according to the modified database schema.

Figure 6D:
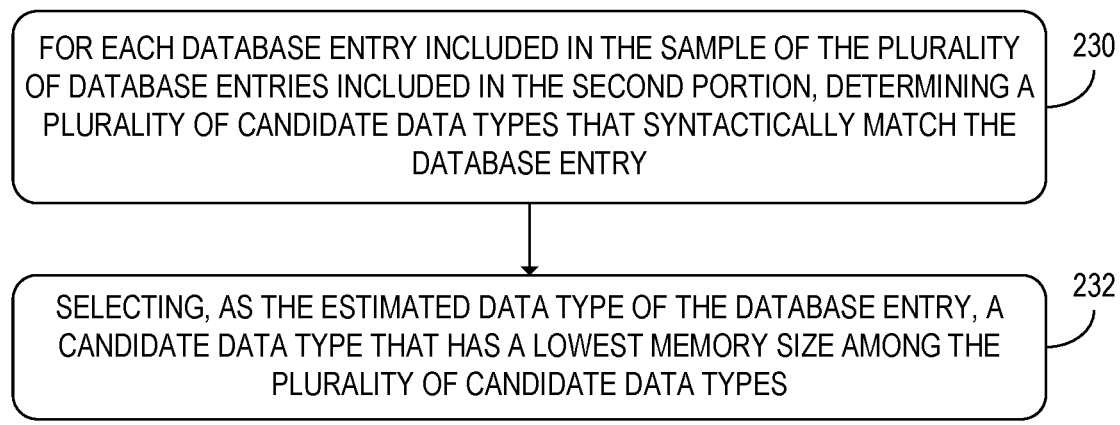

FIG. 6D shows additional steps of the method 200 that may be performed when generating the estimated database schema. At step 230, the method 200 may further include, for each database entry included in the sample of the second portion, determining a plurality of candidate data types that syntactically match the database entry. At step 232, the method 200 may further include selecting, as the estimated data type of the database entry, a candidate data type that has a lowest memory size among the plurality of candidate data types. Thus, the total size of the estimated database schema in the memory of the computing device may be reduced.

Using the devices and methods discussed above, unstructured data may be programmatically incorporated into a database analytics model and one or more database metrics may be generated based at least in part on the unstructured data. In contrast, existing workplace analytics application programs require users who wish to analyze unstructured data to custom-build database schemas for the unstructured data. Those custom-built database schemas may also have to be modified manually when additional unstructured data is received. The systems and methods discussed above may allow for significant time savings by programmatically performing schema generation and updating for unstructured data.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
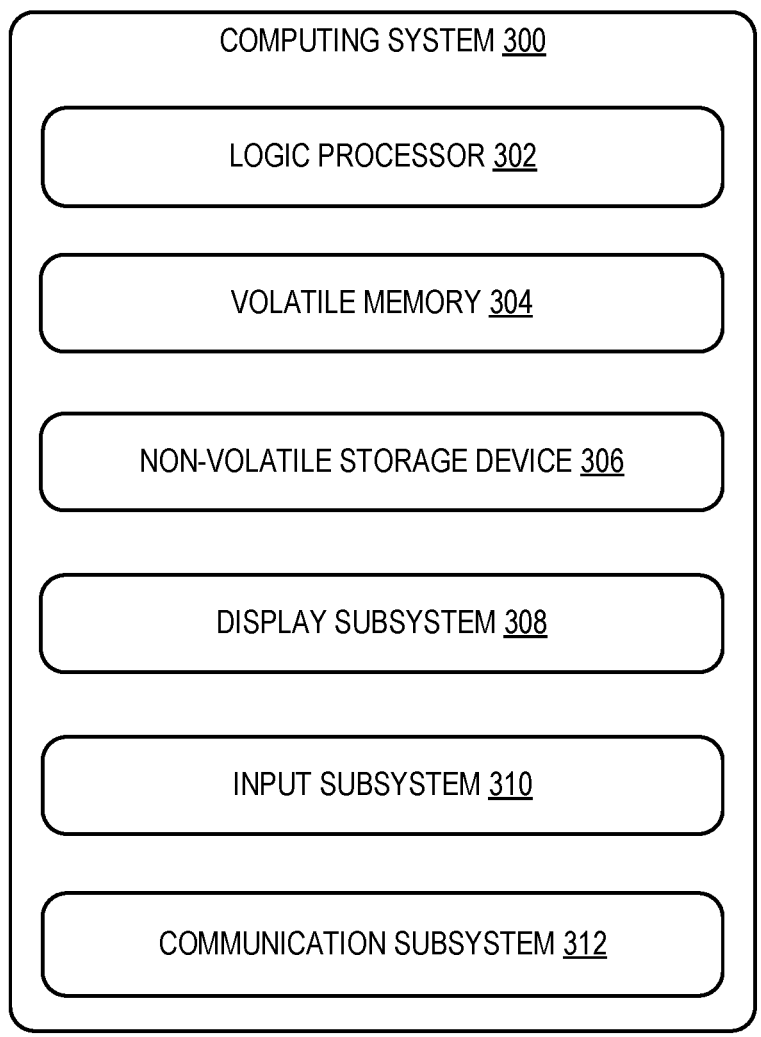
FIG. 7 shows a schematic view of an example computing environment in which the computer device of FIG. 1 may be enacted.

FIG. 7 schematically shows a non-limiting embodiment of a computing system 300 that can enact one or more of the methods and processes described above. Computing system 300 is shown in simplified form. Computing system 300 may embody the computing device 10 described above and illustrated in FIG. 1. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 1.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

According to one aspect of the present disclosure, a computing device is provided, including a processor configured to receive a plurality of database entries. The plurality of database entries may include a first portion of the plurality of database entries that are structured data organized according to a predefined database schema. The plurality of database entries may further include a second portion of the plurality of database entries that are unstructured data not organized according to the predefined database schema. The processor may be further configured to generate an estimated database schema for the second portion. The estimated database schema may include a respective estimated data type for each database entry included in a sample of the plurality of database entries included in the second portion. The processor may be further configured to organize the second portion according to the estimated database schema. The processor may be further configured to identify at least one database entry included in the second portion that does not have the estimated data type indicated for that database entry in the estimated database schema. The processor may be further configured to modify the estimated database schema such that a modified data type indicated for the at least one database entry in the modified database schema matches the estimated data type of the at least one database entry. The processor may be further configured to generate a database analytics model based on the modified database schema and the predefined database schema.

According to this aspect, the processor may be further configured to import the plurality of database entries into the database analytics model.

According to this aspect, the processor may be configured to import the plurality of database entries into the database analytics model at least in part by modifying the respective estimated data types of one or more database entries organized according to the modified database schema such that the one or more database entries have respective modified data types that are compatible with the database analytics model.

According to this aspect, the processor may be further configured to generate one or more database metrics from the database analytics model populated with the plurality of database entries. The one or more database metrics may respectively indicate one or more properties of the plurality of database entries.

According to this aspect, the processor may be further configured to receive a database analytics model query at a graphical user interface (GUI). The processor may be further configured to output the one or more database metrics for display at the GUI in response to the database analytics model query.

According to this aspect, the one or more database metrics include one or more of a collaboration metric, a messaging metric, a time allocation metric, or a survey result.

According to this aspect, the processor may be further configured to receive one or more additional database entries not organized according to the predefined database schema. The processor may be further configured to organize the one or more additional database entries according to the modified database schema.

According to this aspect, the processor may be further configured to perform a join operation over the first portion of the plurality of database entries and the second portion of the plurality of database entries.

According to this aspect, the processor may be configured to generate the estimated database schema at least in part by, for each database entry included in the sample, determining a plurality of candidate data types that syntactically match the database entry. The processor may be further configured to generate the estimated database schema at least in part by, for each database entry included in the sample, selecting as the estimated data type of the database entry a candidate data type that has a lowest memory size among the plurality of candidate data types.

According to this aspect, the processor may be further configured to modify one or more database entries included in the second portion of the plurality of database entries to each have the respective estimated data type indicated for that database entry in the estimated database schema.

According to this aspect, the processor may be further configured to, at a cloud computing platform, receive the first portion of the plurality of database entries from a cloud-hosted first-party application program via a cloud computing analytics application program interface (API). At the cloud computing platform, the processor may be further configured to receive the second portion of the plurality of database entries from a cloud-hosted third-party application program. The cloud-hosted first-party application program and the cloud-hosted third-party application program may respectively include a plurality of first-party user accounts and a plurality of third-party user accounts.

According to another aspect of the present disclosure, a method for use with a computing device is provided. The method may include receiving a plurality of database entries including a first portion of the plurality of database entries that are structured data organized according to a predefined database schema. The plurality of database entries may further include a second portion of the plurality of database entries that are unstructured data not organized according to the predefined database schema. The method may further include generating an estimated database schema for the second portion. The estimated database schema may include a respective estimated data type for each database entry included in a sample of the plurality of database entries included in the second portion. The method may further include organizing the second portion according to the estimated database schema. The method may further include identifying at least one database entry included in the second portion that does not have the estimated data type indicated for that database entry in the estimated database schema. The method may further include modifying the estimated database schema such that a modified data type indicated for the at least one database entry in the modified database schema matches the estimated data type of the at least one database entry. The method may further include generating a database analytics model based on the modified database schema and the predefined database schema.

According to this aspect, the method may further include importing the plurality of database entries into the database analytics model.

According to this aspect, importing the plurality of database entries into the database analytics model may include modifying the respective estimated data types of one or more database entries organized according to the modified database schema such that the one or more database entries have respective modified data types that are compatible with the database analytics model.

According to this aspect, the method may further include generating one or more database metrics from the database analytics model populated with the plurality of database entries. The one or more database metrics may respectively indicate one or more properties of the plurality of database entries.

According to this aspect, the method may further include receiving a database analytics model query at a graphical user interface (GUI). The method may further include outputting the one or more database metrics for display at the GUI in response to the database analytics model query.

According to this aspect, the method may further include receiving one or more additional database entries not organized according to the predefined database schema. The method may further include organizing the one or more additional database entries according to the modified database schema.

According to this aspect, generating the estimated database schema may include, for each database entry included in the sample, determining a plurality of candidate data types that syntactically match the database entry. Generating the estimated database schema may further include, for each database entry included in the sample, selecting as the estimated data type of the database entry a candidate data type that has a lowest memory size among the plurality of candidate data types.

According to this aspect, the method may further include, at a cloud computing platform, receiving the first portion of the plurality of database entries from a cloud-hosted first-party application program via a cloud computing analytics application program interface (API). The method may further include, at the cloud computing platform, receiving the second portion of the plurality of database entries from a cloud-hosted third-party application program. The cloud-hosted first-party application program and the cloud-hosted third-party application program may respectively include a plurality of first-party user accounts and a plurality of third-party user accounts.

According to another aspect of the present disclosure, a computing device is provided. The computing device may include a processor configured to execute a cloud computing platform to, via a cloud computing analytics application program interface (API), receive a first portion of a plurality of database entries from a cloud-hosted first-party application program. The database entries included in the first portion may be structured data organized according to a predefined database schema. The processor may be further configured to receive a second portion of the plurality of database entries from a cloud-hosted third-party application program. The second portion of the plurality of database entries may be unstructured data not organized according to the predefined database schema. The processor may be further configured to generate an estimated database schema for the second portion. The estimated database schema may include a respective estimated data type for each database entry included in a sample of the plurality of database entries included in the second portion. The processor may be further configured to organize the second portion according to the estimated database schema. The processor may be further configured to identify at least one database entry included in the second portion that does not have the estimated data type indicated for that database entry in the estimated database schema. The processor may be further configured to modify the estimated database schema such that a modified data type indicated for the at least one database entry in the modified database schema matches the estimated data type of the at least one database entry. The processor may be further configured to generate a database analytics model based on the modified database schema and the predefined database schema. The processor may be further configured to import the plurality of database entries into the database analytics model. The processor may be further configured to generate one or more database metrics from the database analytics model populated with the plurality of database entries. The one or more database metrics may respectively indicate one or more properties of the plurality of database entries.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   a processor configured to:
      receive a plurality of database entries including:
         a first portion of the plurality of database entries that are structured data organized according to a predefined database schema; and
         a second portion of the plurality of database entries that are unstructured data not organized according to the predefined database schema;
      input, to a trained machine learning model, a sample of the plurality of database entries included in the second portion;
      use the trained machine learning model to generate an estimated database schema for the second portion by determining a plurality of candidate data types that syntactically match each database entry included in the sample, and selecting, as a respective estimated data type, a candidate data type that has a lowest memory size among the plurality of candidate data types, wherein the estimated database schema includes the respective estimated data type for each database entry included in the sample;
      organize the second portion according to the estimated database schema;
      identify at least one database entry included in the second portion that has another data type that does not match the respective estimated data type indicated for the at least one database entry in the estimated database schema;
      modify the estimated database schema such that a modified data type indicated for the at least one database entry in the modified database schema matches the respective estimated data type of the at least one database entry;
      generate a database analytics model based on the modified database schema and the predefined database schema;
      import the plurality of database entries into the database analytics model; and
      generate one or more database metrics from the database analytics model populated with the plurality of database entries, wherein the one or more database metrics respectively indicate one or more properties of the plurality of database entries.

2. The computing device of claim 1, wherein the processor is configured to import the plurality of database entries into the database analytics model at least in part by modifying the respective estimated data types of one or more database entries organized according to the modified database schema such that the one or more database entries have respective modified data types that are compatible with the database analytics model.

3. The computing device of claim 1, wherein the processor is further configured to:

receive a database analytics model query at a graphical user interface (GUI); and output the one or more database metrics for display at the GUI in response to the database analytics model query.

4. The computing device of claim 1, wherein the one or more database metrics include one or more of a collaboration metric, a messaging metric, a time allocation metric, or a survey result.

5. The computing device of claim 1, wherein the processor is further configured to:

receive one or more additional database entries not organized according to the predefined database schema; and organize the one or more additional database entries according to the modified database schema.

6. The computing device of claim 1, wherein the processor is further configured to perform a join operation over the first portion of the plurality of database entries and the second portion of the plurality of database entries.

7. The computing device of claim 1, wherein the processor is further configured to modify one or more database entries included in the second portion of the plurality of database entries to have the respective estimated data type indicated for the one or more database entries in the estimated database schema.

8. The computing device of claim 1, wherein the processor is further configured to:

at a cloud computing platform:

receive the first portion of the plurality of database entries from a cloud-hosted first-party application program via a cloud computing analytics application program interface (API); and receive the second portion of the plurality of database entries from a cloud-hosted third-party application program, wherein the cloud-hosted first-party application program and the cloud-hosted third-party application program respectively include a plurality of first-party user accounts and a plurality of third-party user accounts.

9. A method for use with a computing device, the method comprising:

receiving a plurality of database entries including:

a first portion of the plurality of database entries that are structured data organized according to a predefined database schema; and a second portion of the plurality of database entries that are unstructured data not organized according to the predefined database schema;

inputting, to a trained machine learning model, a sample of the plurality of database entries included in the second portion;

using the trained machine learning model to generate an estimated database schema for the second portion by determining a plurality of candidate data types that syntactically match each database entry included in the sample, and selecting, as a respective estimated data type, a candidate data type that has a lowest memory size among the plurality of candidate data types, wherein the estimated database schema includes the respective estimated data type for each database entry included in the sample;

organizing the second portion according to the estimated database schema;

identifying at least one database entry included in the second portion that has another data type that does not match the respective estimated data type indicated for the at least one database entry in the estimated database schema;

modifying the estimated database schema such that a modified data type indicated for the at least one database entry in the modified database schema matches the respective estimated data type of the at least one database entry;

generating a database analytics model based on the modified database schema and the predefined database schema importing the plurality of database entries into the database analytics model; and generating one or more database metrics from the database analytics model populated with the plurality of database entries, wherein the one or more database metrics respectively indicate one or more properties of the plurality of database entries.

10. The method of claim 9, wherein importing the plurality of database entries into the database analytics model includes modifying the respective estimated data types of one or more database entries organized according to the modified database schema such that the one or more database entries have respective modified data types that are compatible with the database analytics model.

11. The method of claim 9, further comprising:

receiving a database analytics model query at a graphical user interface (GUI); and outputting the one or more database metrics for display at the GUI in response to the database analytics model query.

12. The method of claim 9, further comprising:

receiving one or more additional database entries not organized according to the predefined database schema; and organizing the one or more additional database entries according to the modified database schema.

13. The method of claim 9, further comprising, at a cloud computing platform:

receiving the first portion of the plurality of database entries from a cloud-hosted first-party application program via a cloud computing analytics application program interface (API); and receiving the second portion of the plurality of database entries from a cloud-hosted third-party application program, wherein the cloud-hosted first-party application program and the cloud-hosted third-party application program respectively include a plurality of first-party user accounts and a plurality of third-party user accounts.

14. A computing device comprising:

a processor configured to execute a cloud computing platform to:

via a cloud computing analytics application program interface (API), receive a first portion of a plurality of database entries from a cloud-hosted first-party application program, wherein the database entries included in the first portion are structured data organized according to a predefined database schema;

receive a second portion of the plurality of database entries from a cloud-hosted third-party application program, wherein the second portion of the plurality of database entries are unstructured data not organized according to the predefined database schema;

input, to a trained machine learning model, a sample of the plurality of database entries included in the second portion;

use the trained machine learning model to generate an estimated database schema for the second portion, wherein the estimated database schema includes a respective estimated data type that syntactically matches each database entry included in the sample of the plurality of database entries included in the second portion;

organize the second portion according to the estimated database schema;

identify at least one database entry included in the second portion that has another data type that does not match the respective estimated data type indicated for the at least one database entry in the estimated database schema, wherein the another data type of the at least one database entry is not compatible with a database analytics model;

modify the estimated database schema such that a modified data type indicated for the at least one database entry in the modified database schema matches the respective estimated data type of the at least one database entry, wherein the modified data type is compatible with the database analytics model;

generate the database analytics model based on the modified database schema and the predefined database schema;

import the plurality of database entries into the database analytics model; and generate one or more database metrics from the database analytics model populated with the plurality of database entries, wherein the one or more database metrics respectively indicate one or more properties of the plurality of database entries.

\* \* \* \* \*